US012138775B2

(12) United States Patent
Karri et al.

(10) Patent No.: US 12,138,775 B2
(45) Date of Patent: Nov. 12, 2024

(54) PROVIDING AUTOMATED ASSISTANCE TO PASSENGERS DURING A TRIP

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 17/191,204

(22) Filed: Mar. 3, 2021

(65) Prior Publication Data

US 2022/0281604 A1 Sep. 8, 2022

(51) Int. Cl.
*G06N 3/08* (2023.01)
*B25J 9/16* (2006.01)
*B25J 11/00* (2006.01)
*G06N 20/00* (2019.01)
*G06Q 10/047* (2023.01)
(Continued)

(52) U.S. Cl.
CPC ........... *B25J 11/008* (2013.01); *B25J 9/1666* (2013.01); *G06N 20/00* (2019.01); *G06Q 10/047* (2013.01); *G06Q 10/06316* (2013.01); *B64D 11/0007* (2013.01)

(58) Field of Classification Search
CPC ....... B25J 11/008; B25J 9/1666; G06N 20/00; G06Q 10/047; G06Q 10/06316; B64D 11/0007; G05B 2219/40252; G05B 2219/40411
See application file for complete search history.

(56) References Cited

U.S. PATENT DOCUMENTS 7,316,604 B1 * 1/2008 Burks .................... B64F 5/305
451/438
10,372,231 B2 8/2019 Schalla
(Continued)

FOREIGN PATENT DOCUMENTS

CN 111070222 A 4/2020

OTHER PUBLICATIONS

"Autonomous Collaborative Cabin Service Ceiling Robot System", An IP.com Prior Art Database Technical Disclosure, IP.com No. IPCOM000245243D, IP.com Electronic Publication Date: Feb. 19, 2016, 3 pages.
(Continued)

*Primary Examiner* — Masud Ahmed
(74) *Attorney, Agent, or Firm* — Monchai Chuaychoo

(57) ABSTRACT

An approach for improving performing customer related services for passengers during a trip is disclosed. Customer related services can include delivering meals and beverages to passengers. The approach leverages the use of an overhead robotic system that can identify appropriate movement path in the air (i.e., above passenger's head) so that other passengers are not disturbed by the service to the target passenger. Furthermore, the approach can calculate the current engagement level (i.e., request queue status) of the overhead robotic system and optimize the movement path of the robotic system to provide services to passengers in the shortest possible time. The approach can also perform other functions, such as, medical assistance to assist passengers during the trip.

20 Claims, 5 Drawing Sheets

(51) Int. Cl.
*G06Q 10/0631* (2023.01)
*B64D 11/00* (2006.01)

(56) References Cited

U.S. PATENT DOCUMENTS

| | | | |
|---|---|---|---|
| 11,292,706 B2* | 4/2022 | Showalter | B67D 1/0066 |
| 11,429,113 B2* | 8/2022 | Lee | B25J 9/1697 |
| 2015/0057796 A1* | 2/2015 | Boodaghians | G07F 11/10 |
| | | | 700/236 |
| 2018/0053501 A1* | 2/2018 | Hilal | G10L 15/1822 |
| 2019/0196475 A1* | 6/2019 | Vandewall | B65F 1/1473 |
| 2020/0125888 A1* | 4/2020 | Hacker | G06F 18/22 |
| 2020/0249660 A1* | 8/2020 | Rao | G05B 13/0265 |
| 2021/0352335 A1* | 11/2021 | Watson | H04N 21/2187 |
| 2022/0242588 A1* | 8/2022 | Watson | G08G 5/0021 |
| 2022/0257033 A1* | 8/2022 | Burger | A47B 9/00 |

OTHER PUBLICATIONS

Baichtal, John, "Snake-Bot Roundup", WIRED, Mar. 10, 2000, 7 pages, <https://www.wired.com/2008/03/snake-bot-round/>.

* cited by examiner

PROVIDING AUTOMATED ASSISTANCE TO PASSENGERS DURING A TRIP

BACKGROUND

The present invention relates generally to transportation, and more particularly to performing various tasks during a trip on a vehicle.

A vehicle for transporting passengers and air cargo can be designated as an airliner. The airliner may have multiple crew members, depending on many factors including the number of passengers, distance of the trip and duration. The ratio of crew member to passenger can be one per 50.

Typically during a trip, crew members are performing customer service related duties (e.g., serving drinks/foods, cleaning, restocking, etc.). However, there are some challenges for crew members to perform some or all of the tasks before the conclusion of the trip. Thus, there can be some passengers who may not receive all requested services due to the unavailability of crew members (e.g., helping other passengers, etc.).

SUMMARY

Aspects of the present invention disclose a computer-implemented method, a computer system and computer program product for performing customer related services for passengers during a trip. The computer implemented method may be implemented by one or more computer processors and may include receiving a request from one or more passengers for one or more customer services; determining an initial engagement level of one or more robotic assemblies base on one or more engagement factors and the request from the one or more passengers; determining one or more movement paths for the one or more robotic assemblies base on the initial engagement level; and performing the one or more customer services for the one or more passengers using the one or more movement paths.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1A:
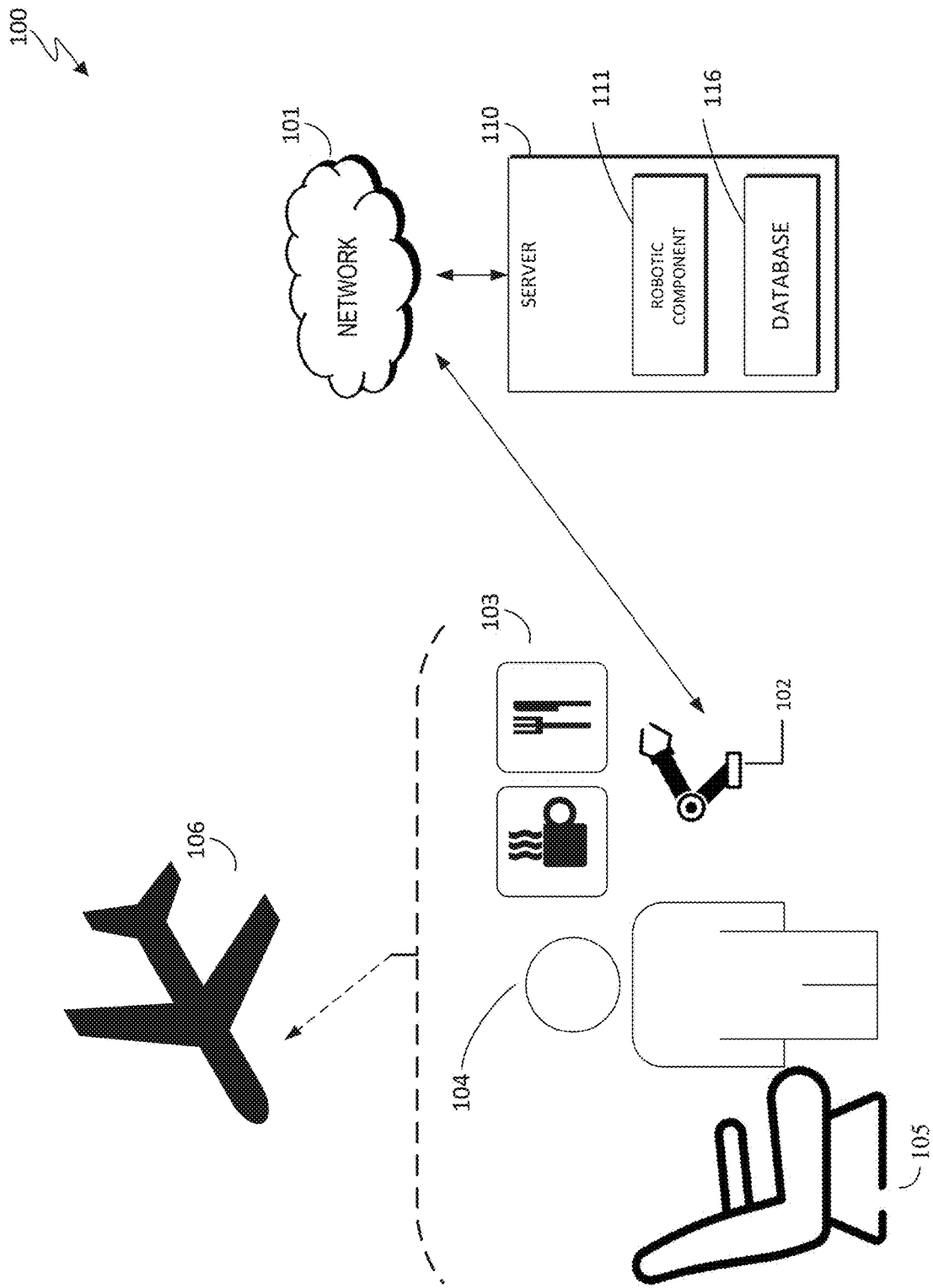
FIG. 1A is a functional block diagram illustrating a robotic service environment, designated as 100, in accordance with an embodiment of the present invention.

During a trip in a vehicle, passengers are provided with some amenities to make their trip more pleasant and comfortable. For example, on an airline flight, flight attendants and/or automated delivery system may serve scheduled meals and snacks at designated time for passengers. There can be times when a passenger may request other ad-hoc services (i.e., not scheduled) through the use of call buttons, located at their seat. An ad-hoc passenger service is typically unplanned, it is very onerous for flight attendants to fulfil the request in a timely manner due to reasons, such as, but it is not limited to, i) finding the service request seat, ii) there can be multiple such service request, sometimes it gets delayed, and iii) many times passengers feels hesitation and/or fearful for submitting multiple such service request. Furthermore, in order to provide ad-hoc service request, the common walking passage is also gets engaged (i.e., blocked) due to the movement of the flight attendants and/or automated delivery system. Thus, the blockage of common walkways can further delay the requested services to the passenger.

Embodiments of the present invention recognizes the deficiencies in the current state of art and provides an approach, through the use of an overhead robotic system to deliver customer-related services to passengers on a transportation vehicle (e.g., airliner, ship, train, etc.) in an effective and timely manner.

The approach leverages the use of an overhead robotic system that can identify appropriate movement path in the air (i.e., above passenger's head) so that other passengers are not disturbed by the service to the target passenger. Furthermore, the approach can calculate the current engagement level (i.e., request queue status) of the overhead robotic system and optimize the movement path of the robotic system to provide services to passengers in the shortest possible time.

Some embodiments of the present invention recognize that one or more suspended (i.e., hanging) robotic system can travel through the airplane (i.e., relying on an overhead rail attached at the roof), while proving service to any passenger. The robotic system can identify the seat location of the passenger who has requested for a service, and accordingly, the robotic system can travel through the overhead rail and can identify the appropriate position on the rail while providing required service to the passenger. Alternately, on larger planes, there can be more than one rail system (e.g., one in the rear end of the plane, one in middle and one in front end) where based on the request received for control unit, the robotic service can be auto activated and it can slide through the rail based on nearest distance metric. The same robotic system can be programmed to auto distribute the work based on requests received to nearest distance and their workload.

Other embodiments of the present invention recognize that the robotic system can recognize the passenger who has requested for a service (i.e., water) by leveraging facial or any other recognition/identification methods (e.g., boarding pass scan option, thumb scan, hand scan, phone number used for booking when entered can request robotic service, etc.). Furthermore, the robotic system can identify the exact position of the passenger (e.g. sitting on the seat, left the seat and standing at a place, walking, etc.) on the airplane, and accordingly, based on the identified service location, the robotic system can proceed directly to the passenger to provide the service.

Other embodiments of the present invention recognize that the proposed robotic system can identify actual service requests, and can also predict the service request from different onboard passengers at a time and accordingly the movement path of the robotic system will be optimized, so that each and every passenger who have requested for service can get service with shortest possible time. Furthermore, based on the predicted and actual service request by the passengers based on various attributes, the proposed robotic system can carry appropriate items, so that at a time, service can be provided to multiple passengers without going back to collect the items (e.g., water bottles, etc.). Additionally, the system can predict when the passenger might need to discard and scrap items (e.g., empty water bottle, etc.) based on activity and behavior analysis, or IoT feed analysis. Accordingly, the robotic system can arrive in a timely fashion to those passengers and collect the scrap items.

Other embodiments of the present invention recognize that robotic system can also be used by physically challenged passengers, wherein the passengers can request on-demand to load/unload their luggage when the flight attendants are busy serving the other passengers.

Other embodiments of the present invention recognize that robotic system has the flexibility of accepting conditional request from passengers. For example, while requesting for a service request, the passenger can define condition via any possible input methods like text/voice on their preferences. The conditions can scenarios such as, but it is not limited to, provide the customer with water when he wakes up from sleep, provide water when the customer finish his food or after five minutes, etc.

Other embodiments of the present invention can provide a status update of the requested service. For example, when any service is requested by a passenger, the computing system can calculate the current engagement level of the overhead robotic system and can notify the appropriate/approximate timeline (i.e., order status) for service to the passenger, so that the passenger will know when they are expected to receive the service in case of only one actively serving robotic embodiment (e.g., in larger planes, when all are busy, etc.).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1A is a functional block diagram illustrating a robotic service environment, designated as 100, in accordance with an embodiment of the present invention. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Robotic service environment 100 includes product network 101, robotic device 102, passenger services 103, passengers 104, passenger seats 105, transportation vehicle 106 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, robotic device 102 and other computing devices (not shown) within robotic service environment 100. It is noted that other computing devices can include, but is not limited to, robotic device 102 and any electromechanical devices capable of carrying out a series of computing instructions.

Robotic device 102 can include electro-mechanical device that is capable of moving objects from one location to another. Robotic device 102 can also include sensors (e.g., cameras, microphones, pressure measurements, screen, etc.) integrated into the device. One end of robotic device 102 can be attached to a rail system and the other end of robotic device 102 can include mechanism for gripping everyday objects. For example, robotic device 102 can be a mechanical arm that is attached to an overhead rail system and capable of picking up physical objects (with grippers and/or pincers). In another example, robotic device can be an arm-like device that articulates from one location (either on a rail system or independently/self guiding/locomotion) to another but has the capability of moving objects (grasping) as it travels. The arm-like device has angled segments that can rotate independently. One end of the arm-like device contains a gripping/grasping mechanism for lifting, holding and releasing objects. It is noted that some grasping mechanism for robotic device 102 may not be universal and an adapter may be necessary used to attach/adapt the grasping mechanism to fit certain objects. For example, certain storage trays may require specialized adapter for the grasping mechanism to secure the trays. The tray adapters may be kept in a compartment box 121 and robotic device 102 may fetch this tool and affix the tool to its own grasping mechanism. Once the task has been completed, robotic device 102 may return the adapter to the storage location or can pass off the adapter to another robotic device (assuming that particular robotic system) requires it for the next task.

One end of the robotic device 102 (that's not attached and/or provides locomotion) may contain beverage dispensing device (i.e., fountain drinks with liquid supply line) and can deliver most commonly requested drinks for during the trip.

The robotic system can have flexible ribs, so that it can move in any direction from any fixed point, and also can expand its length. The length required (to expand) of the robotic system will be based on the distance it need to move to support the passenger. The robotic system can travel on the overhead rail with bearing or magnetic levitation method.

Passenger services 103 are customer related services (e.g., drinks, meals, trash, etc.) that are typically offered during a trip by the transportation company to passengers. For example, airlines provides two meals during trans-Atlantic flights for passengers. Other passenger service can include, but it is not limited to, assisting passengers with loading/unloading luggage from the overhead bins, assist physically-challenged passengers, and provide minor medical assistance.

Passengers 104 are users/people that utilize a transportation service offered by a transportation company.

Passenger seats 105 are physical location/hardware on a vehicle that allows passenger to be safely buckled and/or sit during the trip. Each seat (i.e., passenger seats 105) can have a service request mechanism (e.g., passenger can use touch screen-based method, or voice command-based method to request service, etc.). Furthermore, the seating area can contain various sensors (e.g., ultrasound scanning methods, etc.). The passenger (i.e., 104) can also pair his/her personal device to share specific information about the passenger (e.g., age, occupation, etc.). It is noted that sharing personal information about passenger with embodiments of the invention is on a voluntary basis (i.e., consent). Each and every seat can be identified uniquely, and when the service request is created, the camera (utilizing ultrasound) can recognize the passenger.

Transportation vehicle 106 are vehicles employed by the transportation company that allows passengers to travel from one location to another. For example, transportation vehicle 106 can include, but is not limited to, trains, buses, boats and airplanes.

Server 110 and robotic device 102 can be a standalone computing device, a management server, a web server, a mobile computing device, or any other electronic device or computing system capable of receiving, sending, and processing data. In other embodiments, server 110 and robotic device 102 can represent a server computing system utilizing multiple computers as a server system, such as in a cloud computing environment. In another embodiment, server 110 and robotic device 102 can be a laptop computer, a tablet computer, a netbook computer, a personal computer (PC), a desktop computer, a personal digital assistant (PDA), a smart phone, or any other programmable electronic device capable of communicating other computing devices (not shown) within robotic service environment 100 via network 101. In another embodiment, server 110 and robotic device 102 represents a computing system utilizing clustered computers and components (e.g., database server computers, application server computers, etc.) that act as a single pool of seamless resources when accessed within robotic service environment 100.

Embodiment of the present invention can reside on server 110. Server 110 includes robotic component 111 and database 116.

Robotic component 111 provides the capability of instructing robotic device 102 to provide customer services (e.g., passenger services 103, luggage handling, assist crew members, provide simple medical assistance, etc.) to passengers (i.e., passengers 104) on a vehicle (i.e., vehicle 106).

Database 116 is a repository for data used by robotic component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within robotic service environment 100, provided that robotic component 111 has access to database 116. Database 116 may store information associated with, but is not limited to, food and beverage preferences of passengers, inventor status of beverages, meals and other necessary items during a trip, floorplan of vehicle 106, status of robotic device 102, inventory of items (e.g., meals, drinks, etc.) on the vehicle, corpus of knowledge on rendering medical assistance based on various types of medical emergencies, medical history of passengers (shared voluntarily), list of passengers with medical background/experience (shared voluntarily), age of passengers (based on the ID during booking), flight related information (i.e., duration) and predefined priority list of services.

Figure 1B:
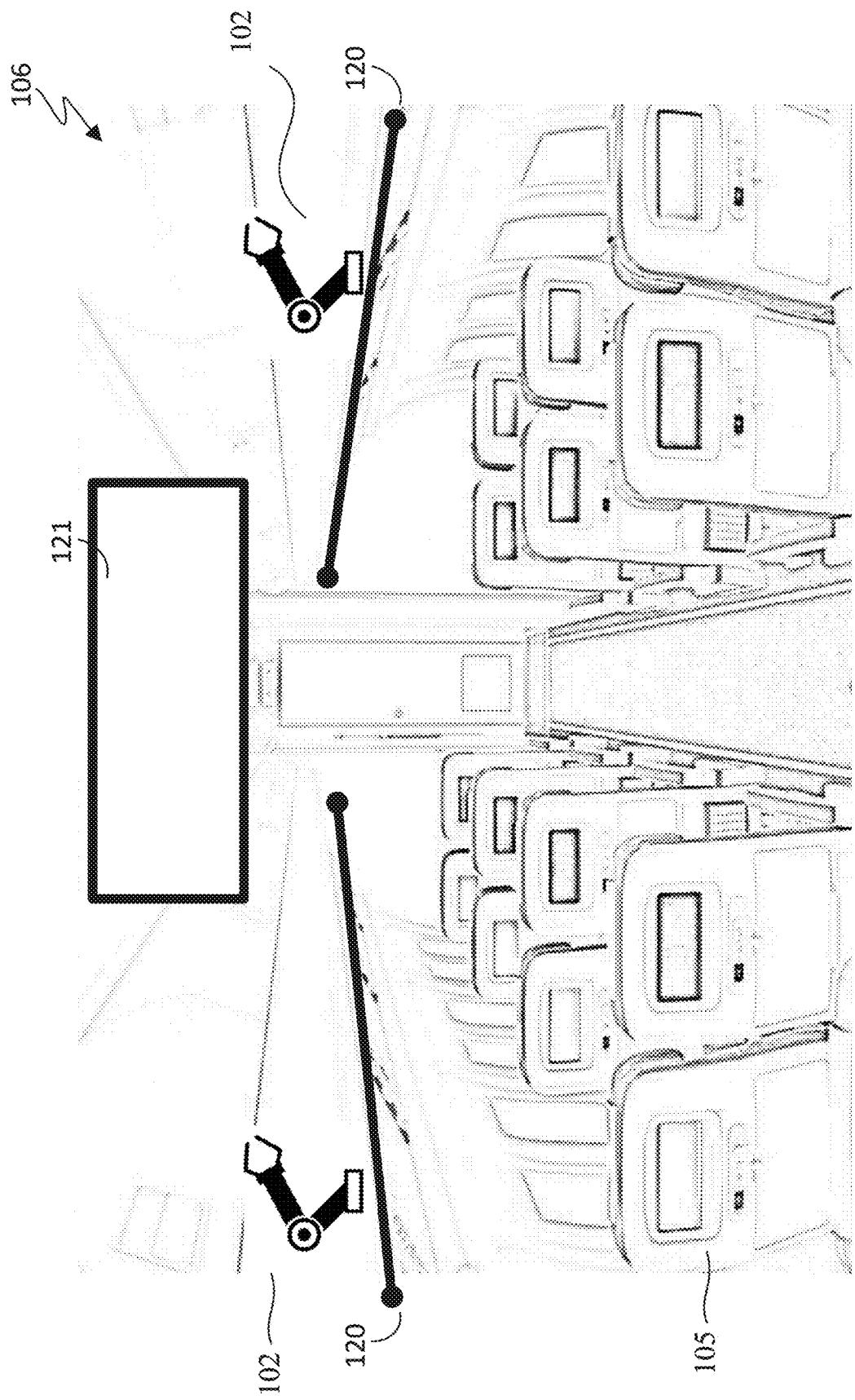
FIG. 1B is a diagram illustrating the expanded view of vehicle 106, in accordance with an embodiment of the present invention.

FIG. 1B is a diagram illustrating the expanded view of vehicle 106, in accordance with an embodiment of the present invention. In the depicted embodiment, vehicle 106 is an airplane. FIG. 1B includes robotic device 102, passenger seats 105, overhead rails 120 and compartment box 121.

Overhead rails 120 are tracks (i.e., guardrails) situated above the passenger's head wherein robotic device 102 can travel along the tracks to provide customer related services to passengers. The tracks can utilize conventional mean of location (e.g., wheels to the rail, bearings, etc.) or can utilize magnetic levitation method. Overhead rails 120 can also be equipped to supply power, beverage supply line and communication to robotic device 102.

Overhead rails can run from the front to the back of the entire plane or it can be segmented with shorter runs. Having shorter runs coupled with several compartment box 121 can increase efficiency and provide quick service to passengers. The number of overhead rails can depend on various factors, such as, but it is not limited to, the size of the airplane, seating arrangement, like two rows, three rows, number of seat per rows, etc. There can be one or more overhead robotic movement path associated with the rails. Movement path denotes the travel path for robotic system which can include traveling to a passenger location and delivering items while avoiding obstacles. One or more robotic device 102 can be attached to a single overhead rail; the number of robotic device 102 per overhead rail can depend on the length of the vehicle (i.e., airplane), and time range to provide service to the passengers.

Compartment box 121 are areas within the airplane that can accommodate items (e.g., water, meals, etc.) that robotic device 102 can quickly obtain to deliver to the passengers without having to travel all the way to the back of the plane or the middle section, where meals and beverages are traditionally often kept. The purpose of multiple chambers are to ensure the robots do not have to travel entire length of the plane to collect the required items needed for service, it can get the required items from the intermediate chambers. The onboard crew will ensure the intermediate chambers are refilled with required items for the passenger service.

Figure 2:
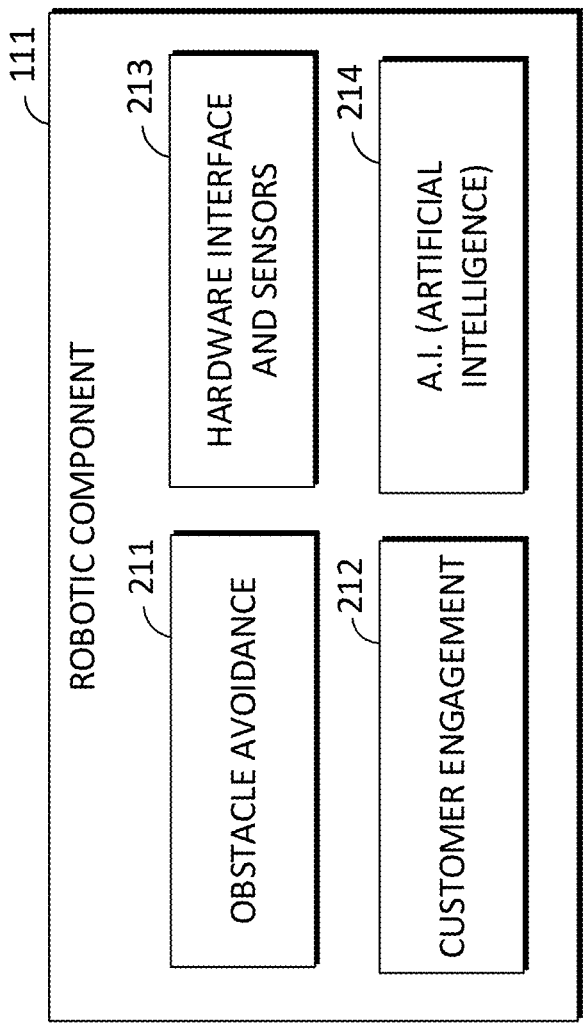
FIG. 2 is a functional block diagram illustrating robotic component 111, designated as 200, in accordance with an embodiment of the present invention.

FIG. 2 is a functional block diagram illustrating robotic component 111 in accordance with an embodiment of the present invention. In the depicted embodiment, robotic component 111 includes obstacle avoidance 211, customer engagement component 212, hardware interface and sensors component 213 and AI (artificial intelligence) component 214.

As is further described herein below, obstacle avoidance 211 of the present invention provides the capability of calculating robotic movement paths for robotic device 102 to travel to the passenger in safe and effective manner while navigating obstacles (e.g., walking passengers/attendants, fixtures on the vehicle, other robotic device 102, food cart, etc.). The robotic movement paths can consist of air path (above the passenger's head) and/or ground path to the designated passenger (i.e., passengers that has requested services). For example, sensors (e.g., cameras, ultrasound, thermal cameras, proximity sensors, etc.) located on robotic device 102 can identify position of any obstacles, position of other robotic device 102, position of other passengers in the surrounding areas along a path towards the targeted passenger and calculate a safe path towards the passenger to deliver the items.

In addition, obstacle avoidance 211 can leverage AI component 214 to help predict future movements that could potentially become obstacles or predict a clear path based on observations/learning of passengers, crew member and location of fixed objects in transportation vehicle 106. By leveraging AI component 214, obstacle avoidance 211 may be able to fulfil the request from the passenger in a timely manner.

As is further described herein below, customer engagement component 212 of the present invention provides the capability, leveraging AI component 214, of managing customer requests by delivering services to the appropriate passengers. Customer engagement component 212 can rely on existing strategies/methods such as order fulfillment, auto work distribution and/or supply chain management. Auto work distribution refers to a methodology where work in general is distributed based on available resources (i.e., number of robotic devices available) and other factors. These other factors can include number of requests, available robotic arm, distance from robot to serve location, types of request, robot capability, current assignment, etc. and these factors along with available resources can identify which robot is available for auto-distributing the work load. Customer engagement component 212 may use a FIFO (first in first out) method of completing request method. A FIFO methodology means that the first received request is immediately fulfilled based on the first available robotic device 102. This method allows the system to prioritize first in and first out (FIFO) of the request queue.

Customer engagement component 212 can identify the position (i.e., queue) of the service request including how many passengers have requested, status of the nearby robotic system (e.g., idle or handling services) and the storage chambers that houses the required item (i.e., items location).

Alternatively, customer engagement component 212 may rely on user-predefined priority and assigned weights in determining how and when requests from passengers are to be fulfilled. For example, the system administrator (e.g., transportation company administrator/policy maker) may prioritize services in the order of importance, such as, providing medical attention would rank first and followed by meals and beverage service. Furthermore, the system administrator may assigned a higher priority to certain status passengers (i.e., frequent flyers with GOLD, PLATINUM and SILVER status) than non-status passengers. A priority-based methodology can be used to assign priority to requests from certain cabin class (e.g., first class, business, economy, etc.). For example, all first class passenger's request takes priority over all other class's request.

Furthermore, customer engagement component 212 can handle conditional requests from passengers. For example, a passenger may request that he be given water after he finishes his meal, or in 5 minutes. Another functionality of customer engagement component 212 is keeping a track of passenger's location. It is possible that passengers may switch seats (forgetting about placing a service request at the previous seat) to another seat during the duration of the trip.

Customer engagement component 212 may include other duties such as removal of trash and other waste that the customer would like to discard. The passenger can request items (e.g., empty bottle water, empty meal plates, etc.) by using IoT based or bar/QR code-based scanning method. Furthermore, customer engagement component 212 may perform sanitization duties on the seats, lavatories and other areas deem necessary as part of the routine trip policy.

Other functionality of customer engagement component 212 may include non-meals delivery duties such as, but it is not limited to, assisting passengers with loading/unloading luggage from the overhead bins, assist physically-challenged passengers, and provide minor medical assistance.

Another functionality of customer engagement component 212 may include the ability to recognize age-restricted type of service. For example, requesting alcohol beverage service can automatically know the age of the passenger in the seat based on their ID (identification). The identification was used to purchase the ticket and the ID contains birthdate information. Thus, based on the birthdate customer engagement component 212 may deny alcoholic beverage service to a minor passenger. Additionally, customer engagement component 212 can keep a track of how many alcoholic beverages has been served to one passenger. Thus, it can deny service if a certain threshold is reached or it can deny service based on a corpus knowledge of a drunkenness state (e.g., cameras detect facial temperature, microphones detects a slurred speech, etc.).

As is further described herein below, hardware interface and sensors component 213 of the present invention provides the capability of managing the movement of one or more robotic system (i.e., robotic device 102). Essentially, hardware interface and sensors component 213 instructs the robotic system to provide services to passengers based on customer engagement component 212.

Furthermore, hardware interface and sensors component 213 can provide another capability of managing communication between sensors and inputs (e.g., passenger's screen/armrest, etc.) with subcomponents of robotic component 111, such as customer engagement component 212, obstacle avoidance 211 and AI component 214. For example, inputs from passenger's armrest can trigger a request event in customer engagement component 212. In another example, sensors (e.g., cameras, etc.) in robotic device 102, can distinguish passenger movement and can identify if the service is to be delivered to passenger's new location/seat.

As is further described herein below, AI (artificial intelligence) component 214 of the present invention provides the capability of learning habits/pattern of passengers and predicting/anticipating behaviors of passengers during a trip. For example, one passenger drinks water every hour on a 12-hour flight. He has already requested and consumed four drinks in four hours. Based on this observed pattern of the passenger, AI component 214 may predict on the fifth hour, that same passenger will request another bottle of water. Furthermore, AI component 214 can further predict that it will need to pick up an empty bottle of water (from the fourth request) as well from the same passenger.

AI component 214, coupled with obstacle avoidance component 211, may learn to predict one or more safe air and/or ground path for robotic device 102 to traverse without collision with obstacles.

Other functionality of AI component 214 may include learning and predicting non-passenger related duties, such as performing inventory and stocking storage compartments when supplies run low, assist a crewmember with maintenance, etc.

Other functionality of AI component 214 may include learning and assisting with medical emergencies. Database 116 may contain a corpus of medical knowledge that AI component 214 may retrieve to assess the medical situation and assist with rendering medical aid. Furthermore, database 116 may contain a list of passengers who have volunteered to share information with the travel crew that they have medical experience (e.g., doctors, medical experts, etc.) or database 116 may contain a list of passengers with medical condition that the passengers have volunteered that information so that the crew can be attentive to their needs. For example, a passenger is allergic to peanuts and forgets to tell the airline (and did not share that information during the book of the trip) and was served with a meal containing peanuts. The passenger goes into a state of allergic shock, another passenger nearby (happens to be a doctor) recognizes the symptom and mentions that this is an allergic reaction common to ingesting peanuts. Robotic device 102 is near the sick passenger and based on the hearing the assessment from the doctor, robotic device 102 goes to the compartment to bring an epi pen to either the crew or the doctor-passenger. Robotic device 102 may also display vital signs (e.g., temperature measured by thermal camera, heartbeat, etc. measured by onboard sensors) of the sick passenger via screen to the doctor-passenger.

Figure 3:
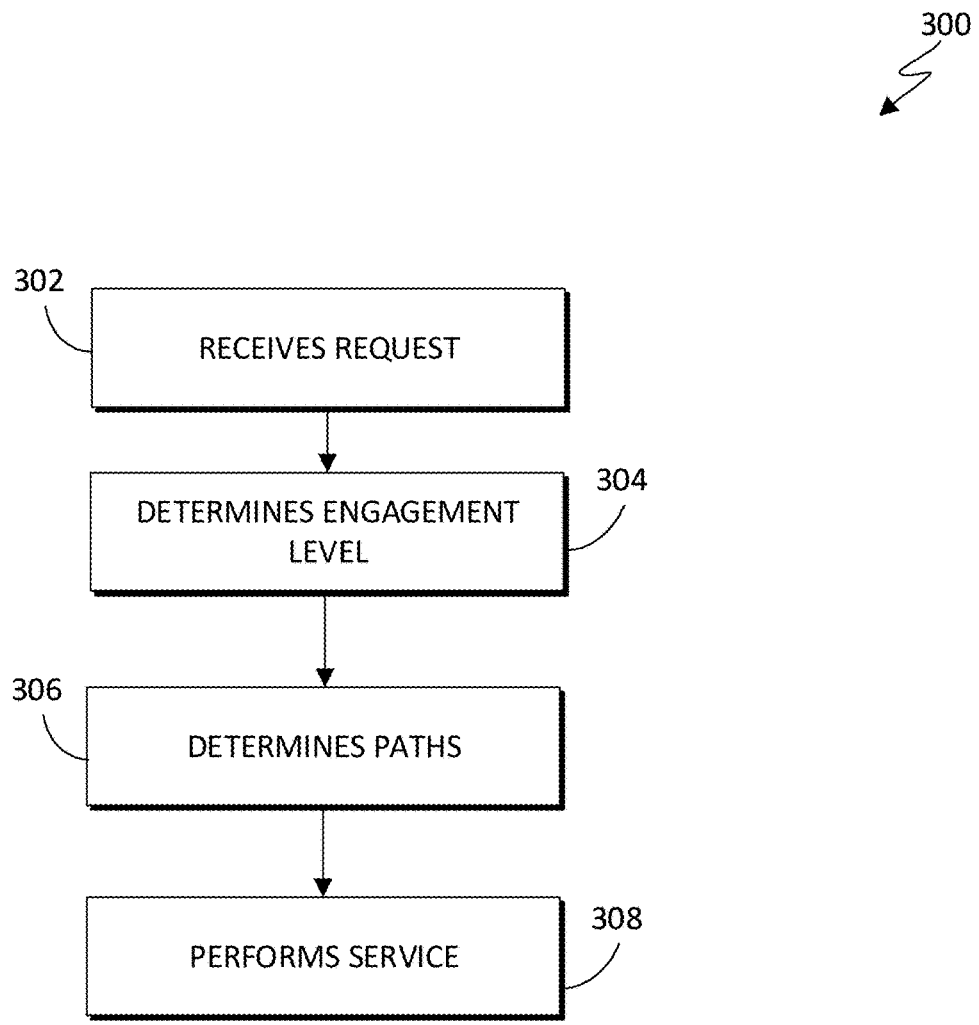
FIG. 3 is a high-level flowchart illustrating the operation of robotic component 111, designated as 300, in accordance with an embodiment of the present invention.

FIG. 3 is a flowchart illustrating the operation of robotic component 111, designated as 300, in accordance with another embodiment of the present invention.

Robotic component 111 receives requests (step 302). In an embodiment, robotic component 111, through hardware interface and sensors component 213 and/or AI component 214, receives a customer service request from a passenger. For example, on a 10-hour transatlantic flight, passenger_A in economy class requests a warm beverage. Passenger_A may use a screen device located on passenger seats 105. Alternatively, passenger_A may hail an idle robotic device 102 and speak directly to request the warm beverage. Robotic device 102 may engage in a dialogue to ensure that the requested item is in stock. If the item is not in stock then robotic device 102 may provide alternatives to the item and ask the passenger to confirm the new option.

Robotic component 111 determines engagement level (step 304). In an embodiment, robotic component 111, through customer engagement component 212 and/or AI component 214, determines the engagement level of robotic device 102. For example, using the previous example with passenger_A, there are 4 robotic devices in economy class and similarly, four robotic devices 102 per cabin (e.g., three cabins on this particular plane). Two robotic device 102 (e.g., economy_robot_1 and economy_robot_2 is engaged with a request from passenger_B and passenger_C. Two other robotic device 102 are idle (e.g., economy_robot_3 and economy_robot_4). Robotic component 111, through customer engagement component 212 and/or AI component 214, can determine which robotic device 102 for economy cabin is selected to deliver the beverage to passenger_A. Currently, two robotic device 102(e.g., economy_robot_1 and economy_robot_2) are engaged with passenger_B and passenger_C, then there are two (e.g., economy_robot_3 and economy_robot_4) available robotic device 102 for passenger_A. Assuming no other passengers has request services after passenger_A and that idle robotic device 102 is not closer to that newly requested passenger, robotic component 111 will select the closest (i.e. economy_robot_4) robotic device 102 to the passenger and/or compartment box 121 (where the beverages are stored).

Robotic component 111 determines one or more paths (step 306). In an embodiment, robotic component 111, through obstacle avoidance 211 and/or AI component 214, determines an available path(s) to fulfil the customer service request. For example, referring the previous example with passenger_A, robotic component 111 has determined that one of robotic device 102 (i.e. economy_robot_4) is available for passenger_A. Robotic component 111, through obstacle avoidance 211 and/or AI component 214, calculates and identify one two safe paths (e.g., air, ground) for economy_robot_4 to deliver the beverage to passenger_A.

Robotic component 111 performs service (step 308). In an embodiment, robotic component 111, through hardware interface and sensors component 213, performs customer related service for the passenger based on the identified safe paths (step 306). For example, robotic component 111 calculate and identified two safe paths to passenger_A, robotic component 111, through hardware interface and sensors component 213, instructs economy_robot_4 to follow one of the safe path to deliver the beverage to passenger_A.

Figure 4:
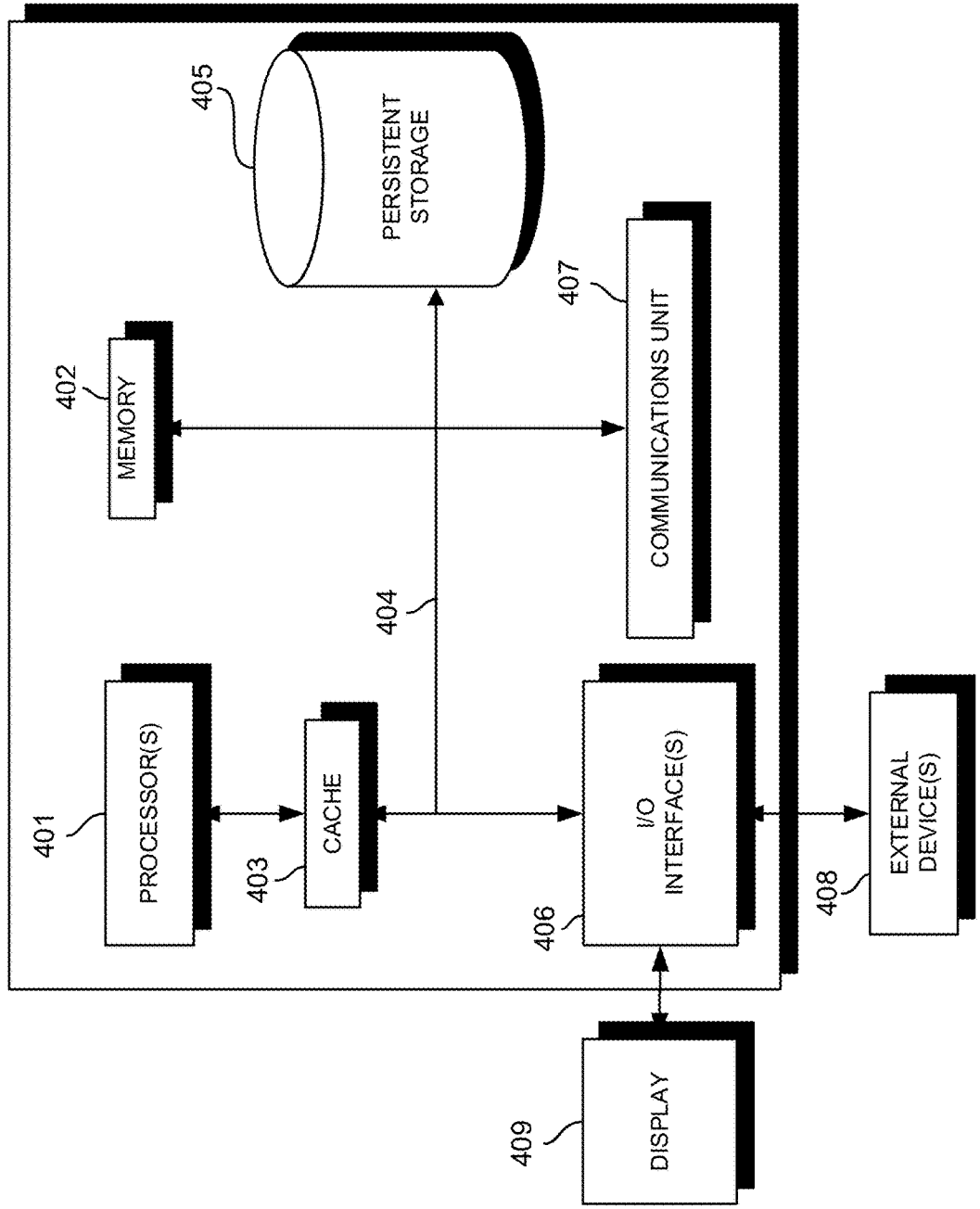
FIG. 4 depicts a block diagram, designated as 400, of components of a server computer capable of executing the robotic component 111 within the robotic service environment, of FIG. 1, in accordance with an embodiment of the present invention.

FIG. 4, designated as 400, depicts a block diagram of components of robotic component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data ×10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Robotic component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Robotic component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Robotic component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for performing customer related services, by leveraging an AI (artificial intelligence) component, for passengers during a trip, the computer-method comprising:
   receiving a request from one or more passengers from a first seating location for one or more customer services, wherein the one or more passengers are situated on an airplane;
   determining an initial engagement level of one or more robotic assemblies base on one or more engagement factors and the request from the one or more passengers, wherein the one or more robotic assemblies is self-guiding and one end of the one or more robotic assemblies consisting of detachable attachment tool;
   prioritizing the request in a queue system wherein priorities of the queue system is based on, at least, frequent flyer status of the one or more passengers and cabin class of the one or more passengers;
   determining one or more movement paths for the one or more robotic assemblies base on the initial engagement level;
   performing the one or more customer services for the one or more passengers using the one or more movement paths;
   determining whether the one or more passengers are still seated at the first seating location; and
   in responsive to the one or more passengers switched to a second seating location, recalculating a new path for the one or more robotic assemblies to travel towards the second seating location.

2. The computer-implemented method of claim 1, wherein receiving the request from the one or more passengers is based on an initiated request by the one or more passengers and/or anticipating, leveraging machine learning, the one or more passengers.

3. The computer-implemented method of claim 1, wherein the one or more customer services consisting only of, providing meals, assisting with loading and/or unloading luggage from overhead bins, assisting physically challenged passengers.

4. The computer-implemented method of claim 1, wherein the one or more robotic assemblies is self guiding and includes a gripping mechanism.

5. The computer-implemented method of claim 1, wherein determining the initial engagement level of the one or more robotic assemblies further comprising:
   determining availability of the one or more robotic assemblies;
   determining a request queue based on the number of requests; and
   calculating the initial engagement level based on the request queue and availability of the one or more robotic assemblies.

6. The computer-implemented method of claim 5, wherein determining the one or more movement paths for the one or more robotic assemblies further comprising:
   determining a location of the request by the one or more passengers;
   determining a type of the one or more customer services by the one or more passenger;
   selecting the one or more robotic assemblies based on the engagement level; and
   calculating the one or more paths based on the selected one or more robotic assemblies and avoiding one or more obstacles.

7. The computer-implemented method of claim 1, wherein the one or more obstacles further comprises, other robotic assemblies, passengers, crew members, fixtures on the vehicle and meal carts.

8. A computer program product for performing customer related services, by leveraging an AI (artificial intelligence) component, for passengers during a trip, the computer program product comprising:
   one or more computer readable storage media and program instructions stored on the one or more computer readable storage media, the program instructions comprising:
      program instructions to receive a request from one or more passengers from a first seating location for one or more customer services, wherein the one or more passengers are situated on an airplane;
      program instructions to determine an initial engagement level of one or more robotic assemblies base on one or more engagement factors and the request from the one or more passengers, wherein the one or more robotic assemblies is self-guiding and one end of the one or more robotic assemblies consisting of detachable attachment tool;

program instructions to prioritize the request in a queue system wherein priorities of the queue system is based on, at least, frequent flyer status of the one or more passengers and cabin class of the one or more passengers;

program instructions to determine one or more movement paths for the one or more robotic assemblies base on the initial engagement level;

program instructions to perform the one or more customer services for the one or more passengers using the one or more movement paths;

program instructions to determine whether the one or more passengers are still seated at the first seating location; and in responsive to the one or more passengers switched to a second seating location, program instructions to recalculate a new path for the one or more robotic assemblies to travel towards the second seating location.

9. The computer product of claim 8, wherein program instructions to receive the request from the one or more passengers is based on an initiated request by the one or more passengers and/or anticipating, leveraging machine learning, the one or more passengers.

10. The computer product of claim 8, wherein the one or more customer services consisting only of, providing meals, assisting with loading and/or unloading luggage from overhead bins, assisting physically challenged passengers.

11. The computer product of claim 8, wherein the one or more robotic assemblies is self guiding and includes a gripping mechanism.

12. The computer product of claim 8, wherein program instructions to determine the initial engagement level of the one or more robotic assemblies further comprising:

program instructions to determine availability of the one or more robotic assemblies;

program instructions to determine a request queue based on the number of requests; and program instructions to calculate the initial engagement level based on the request queue and availability of the one or more robotic assemblies.

13. The computer product of claim 12, wherein program instructions to determine the one or more movement paths for the one or more robotic assemblies further comprising:

program instructions to determine a location of the request by the one or more passengers;

program instructions to determine a type of the one or more customer services by the one or more passenger;

program instructions to select the one or more robotic assemblies based on the engagement level; and program instructions to calculate the one or more paths based on the selected one or more robotic assemblies and avoiding one or more obstacles.

14. A computer system for performing customer related services, by leveraging an AI (artificial intelligence) component, for passengers during a trip, the computer system comprising:

one or more computer processors;

one or more computer readable storage media;

program instructions stored on the one or more computer readable storage media for execution by at least one of the one or more computer processors, the program instructions comprising:

program instructions to receive a request from one or more passengers from a first seating location for one or more customer services, wherein the one or more passengers are situated on an airplane;

program instructions to determine an initial engagement level of one or more robotic assemblies base on one or more engagement factors and the request from the one or more passengers, wherein the one or more robotic assemblies is self-guiding and one end of the one or more robotic assemblies consisting of detachable attachment tool;

program instructions to prioritize the request in a queue system wherein priorities of the queue system is based on, at least, frequent flyer status of the one or more passengers and cabin class of the one or more passengers;

program instructions to determine one or more movement paths for the one or more robotic assemblies base on the initial engagement level;

program instructions to perform the one or more customer services for the one or more passengers using the one or more movement paths;

program instructions to determine whether the one or more passengers are still seated at the first seating location; and in responsive to the one or more passengers switched to a second seating location, program instructions to recalculate a new path for the one or more robotic assemblies to travel towards the second seating location.

15. The computer system of claim 14, wherein program instructions to receive the request from the one or more passengers is based on an initiated request by the one or more passengers and/or anticipating, leveraging machine learning, the one or more passengers.

16. The computer system of claim 14, wherein the one or more customer services consisting only of, providing meals, assisting with loading and/or unloading luggage from overhead bins, assisting physically challenged passengers.

17. The computer system of claim 14, wherein the one or more robotic assemblies is self guiding and includes a gripping mechanism.

18. The computer system of claim 14, wherein program instructions to determine the initial engagement level of the one or more robotic assemblies further comprising:

program instructions to determine availability of the one or more robotic assemblies;

program instructions to determine a request queue based on the number of requests; and program instructions to calculate the initial engagement level based on the request queue and availability of the one or more robotic assemblies.

19. The computer system of claim 18, wherein program instructions to determine the one or more movement paths for the one or more robotic assemblies further comprising:

program instructions to determine a location of the request by the one or more passengers;

program instructions to determine a type of the one or more customer services by the one or more passenger;

program instructions to select the one or more robotic assemblies based on the engagement level; and program instructions to calculate the one or more paths based on the selected one or more robotic assemblies and avoiding one or more obstacles.

20. The computer system of claim 14, wherein the one or more obstacles further comprises, other robotic assemblies, passengers, crew members, fixtures on the vehicle and meal carts.

* * * * *